United States Patent Office 3,419,505
Patented Dec. 31, 1968

3,419,505
POLYMERIZATION PROCESS EMPLOYING A MODIFIED IRON COORDINATION CATALYST
William E. Marsico, Dallas, Tex., assignor to Columbia Carbon Company, New York, N.Y., a corporation of Delaware
No Drawing. Continuation-in-part of application Ser. No. 400,543, Sept. 30, 1964. This application Aug. 18, 1965, Ser. No. 480,787
19 Claims. (Cl. 260—2)

ABSTRACT OF THE DISCLOSURE

A description is provided of the preparation of highly active homogeneous iron coordination catalysts by the interaction of a hydrocarbon soluble ferric compound, an aluminum alkyl and a phosphorus ester having at least one phosphinic hydrogen group. The use of such catalysts is illustrated by the homopolymerization of 1,2-alkylene oxides and conjugated dienes and the interpolymerization of conjugated dienes with alpha-olefins, alpha-unsaturated nitriles or alkylene oxides.

---

This invention relates to a catalytic process for the preparation of homopolymers and interpolymers of various polymerizable organic monomers. This invention also relates to a novel interpolymer produced by applying the process of this invention to an admixture of a conjugated aliphatic diene and an epoxide.

This application is a continuation-in-part of my copending application Ser. No. 400,543, filed Sept. 30, 1964, now U.S. Patent No. 3,340,489, entitled "Composition of Matter."

Coordination catalysts prepared by the interaction of iron compounds with various reducing agents in the presence of triorgano phosphines and phosphites art well known in the prior art. Such compositions have been suggested for use as catalysts for the preparation of cyclic and linear homooligomers of lower aliphatic conjugated dienes and low molecular weight cooligomers of these dienes with certain vinyl hydrocarbons; however, they have met with little commercial acceptance as catalysts for the production of high polymers because of the excessive induction periods and reaction times and low yields which accompany their use.

It is an object of this invention to provide a process, utilizing certain iron coordination catalysts as described below, for producing high molecular weight homopolymers and interpolymers of conjugated dienes in high yield and without the disadvantages which have characterized prior art processes. More specifically it is an object of this invention to prepare polymers of conjugated aliphatic dienes and of epoxides. It is a further object of this invention to prepare interpolymers of conjugated aliphatic dienes and of epoxides. It is a further object of this invention to prepare interpolymers of conjugated aliphatic dienes and ethylenically unsaturated monomers, particularly those containing terminal unsaturation. It is yet a further object of this invention to prepare novel interpolymers of conjugated aliphatic dienes and epoxides which are elastomeric and sulfur-curable. It is still another object of this invention to prepare interpolymers of acrylonitrile, butadiene and styrene. It is still yet another object of this invention to prepare interpolymers of ethylene, propylene and butadiene. Further objects and features of advantage will be apparent from a consideration of the following detailed description of the invention.

It has now been found that the above objects can be accomplished by the use of a novel catalyst composition which is an admixture product of (a) an iron (III) compound, (b) a hydrocarbyl, hydrocarboxy or hydride compound of aluminum, and (c) a phosphorus ester having at least one phosphinic hydrogen atom. By the use of these catalyst compositions in the practice of the process of the instant invention one obtains unexpectedly rapid and highly selective production of high molecular weight homopolymers and interpolymers as described below. The use of these novel iron coordination compositions in the practice of the process of the present invention exhibit catalytic activity which is unexpectedly superior to that possessed by the similar coordination catalysts of the prior art. This superiority is manifested by a drastic reduction in reaction time and a multifold increase in high polymer selectivity over that experienced in the low temperature polymerization of conjugated aliphatic dienes with the prior art catalysts (cf. Examples XV and XVI). This high catalytic activity is further demonstrated by the fact that the catalyst compositions employed in the practice of the process of the present invention can be used in very low concentration to effect the rapid and efficient production of high molecular weight alkylene oxide homopolymers and interpolymers of alkylene oxides and conjugated dienes. The use of the prior art iron coordination catalyst compositions have proven ineffective in the interpolymerization of conjugated dienes and alkylene oxides.

A mode of accomplishing the above objects is to subject the monomers or mixtures of monomers, above-mentioned, to reaction pressures of from about 1 atmosphere to about 1,000 atmospheres, and to temperatures of from about −30° C. to about 300° C. in the presence of the novel catalyst system mentioned above. It is to be understood that both higher or lower temperatures and pressures may be employed in the practice of the process of the present invention. However, it is seldom necessary to operate outside the preferred pressure and temperature ranges, which are from about 1 atmosphere pressure to about 50 atmospheres pressure and temperatures from about 15° C. to about 180° C.

The process of the instant invention may be conducted either in the presence, or absence of a solvent. When the monomer is in the vapor phase under selected temperature and pressure conditions, it is often preferable to employ an inert liquid diluent which is free of ethylenic or acetylenic unsaturation. Such suitable solvents are those which are essentially unreactive with the catalyst or the catalyst components and with unsaturated aliphatic and cycloaliphatic hydrocarbons. Exemplary of such suitable unreactive solvents are, hexane, octane, cyclohexane, benzene, toluene, xylene, chlorobenzene, dioxane and tetrahydrofuran.

Monomers which will undergo homopolymerization by the practice of the process of the present invention are conjugated aliphatic dienes and epoxides. Exemplary of the conjugated aliphatic dienes which will homopolymerize in accordance with the process of the present invention are:

| | |
|---|---|
| 1,3-butadiene | 2,4-hexadiene |
| Isoprene | 4-methyl-1,3-hexadiene |
| Chloroprene | 2,4-heptadiene |
| 2,3-dimethyl-1,3-butadiene | 2,6-dimethyl-1,3-heptadiene |
| 2-ethyl-1,3-butadiene | 7-methyl-2,4-octadiene |
| 1,3-pentadiene | 1,3-decadiene |

Exemplary of the epoxide monomers which will homopolymerize in accordance with the process of the present invention are:

| | |
|---|---|
| Ethylene oxide | 1,2-epoxycyclooctane |
| Propylene oxide | 1,2,3,4-diepoxybutane |
| 1-chloro-2,3-epoxypropane | 1,2,4,5-diepoxycyclohexane |
| Isobutylene oxide | 1,2,5,6-diepoxycyclooctane |
| 1,2-epoxybutane | Styrene oxide |
| 2,3-epoxybutane | |

The class of epoxides which are preferred in the practice of the process of the present invention are of the formula:

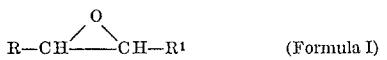   (Formula I)

wherein R and R¹ are selected from the group consisting of hydrogen and lower alkyl radicals.

A type of interpolymer which can be produced is the polymer formed by the reaction of one or more conjugated aliphatic dienes and one or more monoolefinic polymerizable monomers of the formula:

   (Formula II)

wherein $R^2$ is selected from the group consisting of hydrogen and hydrocarbyl radicals and $R^3$ is selected from the group consising of hydrogen, hydrocarbyl, substituted hydrocarbyl, halogen, nitrile and

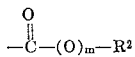

wherein $m$ is 0 or 1.

Compounds in which $R^2$ and $R^3$ are hydrogen or hydrocarbyl groups, represent a preferred class of compounds of this formula. Examples of such suitable hydrocarbyl groups are aliphatic groups, such as methyl, propyl, butyl, isobutyl, 2-ethylhexyl and cyclohexyl and aromatic groups, such as phenyl, tolyl and xylyl. Exemplary momomers of the above formula which are useful in the practice of the present invention are:

| | |
|---|---|
| Ethylene | Vinyl cyclohexene |
| Propylene | Styrene |
| 1-butene | p-Chlorostyrene |
| 1-pentene | Allylbenzene |
| 1-hexene | Methyl styrene |
| 1-heptene | Vinyl chloride |
| 1-octene | Vinyl bromide |
| Allyl alcohol | Acrylonitrile |
| 3-methoxypropene | Acrolein |
| 3-ethyoxypropene | Methacrolein |
| 5-hexene-2-one | Methyl methacrylate |
| Allyl chloride | Acrylic acid |
| Methallyl chloride | Methacrylic acid |
| Allyl cyanide | Methyl acrylate |
| Vinyl cyclohexane | |

Another type of interpolymer which can be produced is the polymer formed by the reaction of one or more conjugated aliphatic dienes and one or more epoxides. Interpolymers of this type have not previously been reported in the prior art. These monomers may be polymerized in any desired ratio. For example, sulfur curable interpolymers can be produced using as little as about 1% by weight of 1,3-butadiene to as much as 90% by weight of 1,3-butadiene or more. In addition to being sulfur curable these novel interpolymers are elastomeric, resistant to oxidative attack and possess excellent wear characteristics. Accordingly these types of polymers can readily be used as a substitute for natural and known synthetic rubbers in many applications, such as automobile tires, weather stripping, etc. Exemplary of the conjugated aliphatic dienes which can enter into this interpolymerization are: 1,3-butadiene, isoprene, chloroprene, 2,3-dimethyl-1,3-butadiene, 2-ethyl-1,3-butadiene, 1,3 - pentadiene, 2,4-hexadiene, 4-methyl-1,3-hexadiene, 2,4-heptadiene, 2,6-dimethyl-1,3-heptadiene, 7-methyl-2,4-octadiene and 1,3-decadiene. Exemplary epoxides which will enter into interpolymerization reaction with the conjugated aliphatic dienes are:

| | |
|---|---|
| Ethylene oxide | 1,2-epoxycyclooctane |
| Propylene oxide | 1,2,3,4-diepoxybutane |
| 1-chloro-2,3-epoxypropane | 1,2,4,5-diepoxycyclohexane |
| Isobutylene oxide | 1,2,5,6-diepoxycyclooctane |
| 1,2-epoxybutane | Styrene oxide |
| 2,3-epoxybutane | |

The class of epoxides which are preferred in the practice of the process of the present invention are of the formula:

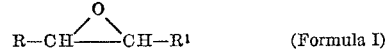   (Formula I)

wherein R and R¹ are selected from the group consisting of hydrogen and lower alkyl radicals.

By the practice of the process of the instant invention other types of interpolymers may be produced in addition to the interpolymers discussed above, as will be obvious to one skilled in the art. Interpolymers of two or more conjugated dienes may be prepared, such as an interpolymer of 1,3-butadiene and isoprene, as well as interpolymers of two or more epoxides, such as an interpolymer of ethylene oxide and propylene oxide. Another interpolymer which can be prepared is an acrylonitrile, 1,3-butadiene, α-methyl styrene terpolymer. Also, an ethylene, propylene, isoprene terpolymer can be prepared.

The catalyst compositions which may be employed in the practice of the process of the present invention are admixture products of (a) an iron (III) compound, (b) a hydrocarbyl, hydrocarboxy or hydride compound of aluminum, and (c) a phosphorus ester having at least one phosphinic hydrogen atom.

Catalytic compositinos which may be employed in the practice of the process of the present invention can be prepared from any iron (III) compound. Illustrative of such iron (III) inorganic compounds are: ferric fluoride, ferric iodide, ferric bromide, ferric chloride, ferric oxide, ferric hydroxide, ferric hypophosphite, ferric orthophosphate, feric thiocynate, ferric ferricyanide, ammonium ferricyanide, potassium ferric sulphate and others. Examples of iron (III) organic compounds which can be used in the practice of the process of the present invention include salts of acetic, propionic, hexanoic, ethyl hexanoic, oleic, stearic, oxalic, suberic, benzoic, trimellitic, citric, lactic, and tall oil acids, as well as ferric derivatives of alcohols, ketones, aldehydes and nitrogen containing organics such as benzoylacetone, dimethylglyoxime, 8-hydroxy quinoline, glycine, nitrosophenylhydroxylamine, etc., and complexes of organic molecules with inorganic ferric salts, such as tetrapyridine ferric chloride. From a practical viewpoint, however, it is often desirable to prepare the catalysts in solvent for one or more of the components. The use of such solvents, which are described in detail below, generally facilitates the rapid interaction and high utilization of the components, factors which are of the utmost importance in commercial applications. Iron (III) compounds which have a significant solubility in said solvents are therefore highly desirable and represent a preferred source of the heavy metal component. Such preferred iron (III) sources include the ferric halides, such as ferric chloride; ferric salts of monobasic carboxylic acids, preferably having at least six carbon atoms, such as ferric naphthenate; and ferric chelates in which the organic chelating group is bonded to the iron with both conventional and coordination bonds, such as ferric acetyl acetonate.

The aluminum containing component of the catalyst employed in the practice of the process of the present invention may be any hydrocarbyl ,hydrocarboxy or hydride compound of aluminum. Illustrative of such compounds are: trimethyl aluminum, triisobutyl aluminum, trioctyl aluminum, tridodecyl aluminum, tricyclohexyl aluminum, triphenyl aluminum, tritolyl aluminum, phenyoxydiethyl aluminum, diethyoxyethyl aluminum, isobutyl aluminum dihydride, aluminum hydride and diethyl phenyl aluminum. A preferred class of aluminum containing components is represented by the general formula:

(Formula III)

wherein $R^4$ is an alkyl radical and A is selected from the group consisting of alkyl, lower alkoxy and hydride radicals. Examples of such preferred compounds include tri(polyethylene) aluminum compounds in which each polyethylene group contains from about six to about thirty carbon atoms, ethoxydiethyl aluminum and diethyl aluminum hydride. Alkyl aluminum compounds such as triethyl aluminum and triisobutyl aluminum represent an especially preferred embodiment for use in the practice of the process of the present invention.

The phosphorus esters which have been found to be suitable for use as components of the catalyst compositions in the practice of the process of the present invention are those having at least one phosphinic hydrogen atom; i.e., esters having at least one hydrogen atom bonded directly to phosphorus, or tautomers thereof. Suitable esters of this type can be represented by the general formula:

(Formula IV)

wherein Z is selected from the group consisting of H, $R^5$, and OH radicals, $R^5$ is selected from the group consisting of hydrocarbyl, substituted hydrocarbyl, hydrocarboxy and substituted hydrocarboxy radicals and $n$ is from 0 to 1 inclusive. Illustrative of such suitable esters are the following compounds:

Dimethyl hydrogen phosphite
Diallyl hydrogen phosphite
Dioctyl hydrogen phosphite
Didodecyl hydrogen phosphite
Dibenzyl hydrogen phosphite
Dicyclohexyl hydrogen phosphite
Di(p-methylphenyl) hydrogen phosphite
Phenyl isobutyl hydrogen phosphite
Di(2-phenylethyl) hydrogen phosphite
Di(2-methoxyethyl) hydrogen phosphite
Di(p-chlorophenyl) hydrogen phosphite
Di(2-methoxyphenyl) hydrogen phosphite
Methyl dihydrogen phosphite
Isopropyl dihydrogen phosphite
2-ethylhexyl dihydrogen phosphite
Cyclohexyl dihydrogen phosphite
Phenyl dihydrogen phosphite
p-chlorophenyl dihydrogen phosphite
2-methoxyphenyl dihydrogen phosphite
Dimethyl phosphine
Diphenyl phosphine
Methyl phosphine oxide
Phenyl phosphine oxide
Dimethyl phosphine oxide
Diphenyl phosphine oxide
Methyl hydrogen phosphonite
Dodecyl hydrogen phosphonite
Phenyl hydrogen phosphonite
Methyl phosphinic acid
2-ethylhexyl phosphinic acid
Benzyl phosphinic acid
Phenyl phosphinic acid
p-Methylphenyl phosphinic acid
p-Chlorophenyl phosphinic acid Many of these esters are known to exist as trivalent or pentavalent phosphorus tautomers, either of which can be used as a component of the catalyst compositions employed in the practice of the process of the present invention. The nomenclature used above, while strictly applicable only to a single tautomer, is commonly applied to either tautomeric form and is so intended as used herein. For example, the name, methyl dihydrogen phosphite, while strictly applicable only to the structure:

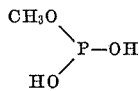
(Formula V)

is, as used herein, intended to be inclusive of either this structure or its pentavalent phosphorus tautomer:

(Formula VI)

as well as mixtures thereof. Similarly, it should be understood that the name methyl hydrogen phosphonate, which is strictly descriptive only of the pentavalent phosphorus tautomer, is to be given its common meaning, which encompasses both tautomeric forms.

Preferred groups of phosphorus esters are those which can be represented by the formula:

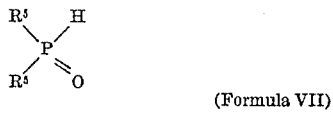
(Formula VII)

and

(Formula VIII)

wherein $R^5$ has the same meaning as set forth above. Esters of Formulae VII and VIII in which $R^5$ is a hydrocarboxy radical have been found to be especially suitable catalyst components. Typical of these unusually effective esters are phenyl phosphinic acid, phenyl dihydrogen phosphite, di(2-ethylhexyl)hydrogen phosphite and diphenyl hydrogen phosphite.

It has been found that the ratio of the components of catalysts used in the practice of the process of the present invention may be varied over a wide range. A catalytically active composition can be produced with a molar ratio of iron to aluminum in the components of from about 1:0.1 to about 1:25 or higher. Similarly, the molar ratio of iron to phosphorus may be varied from 1:0.1 to about 1:25 and higher. Molar ratios outside these ranges can be used; however, there is no apparent advantage in using very large excesses of any component. In general, it is preferred to utilize a molar ratio of iron to aluminum of from about 1:0.5 to about 1:10 and an iron to phosphorus ratio of from about 1:0.5 to about 1:8.

The order of addition of the catalyst components is not critical; however, with regard to the polymerization of the epoxides, it is preferred to form the catalyst in the presence of the epoxide. The admixture of components may be effected either in the presence or absence of a solvent medium. It generally has been found, however, that the interaction of the components is facilitated by effecting the admixture in the presence of an inert solvent medium. Examples of such inert solvents include aromatic and aliphatic hydrocarbons which are free of ethylenic or acetylenic unsaturation, such as, benzene, toluene, xylene, isooctane, normal hexane and liquid propane, or saturated cyclic ethers such as, tetrahydrofuran and 1,4-dioxane. Ring substituted halogenated aromatics, such as chlorobenzene and p-chlorotoluene likewise can be satisfactorily utilized as inert solvents. Alternatively, the catalyst compositions may be formed in situ in a polymerization system, in which case the unreacted monomer or liquid polymer may serve as a solvent.

The catalyst compositions employed in the practice of the process of the present invention may be produced by admixing the components over a wide temperature range. Catalytic compositions can be obtained at temperatures above 300° C. and below −30° C.; however, it is seldom desirable or necessary to utilize temperatures outside the preferred range of from about 0° C. to about 150° C. The interaction of the components is generally extremely rapid and often is accompanied by a color change. Because of this rapid interaction and the stability of the product over a wide temperature range, the catalysts employed in the practice of the process of the present invention may be preformed and stored for substantial periods before being used in a polymerization reaction or they may be formed in the presence of the polymerizable monomers under conventional polymerization conditions.

Although these catalytic compositions are simple to prepare and are generally quite stable and insensitive to most extraneous materials, the incorporation therein of an aluminum hydrocarbyl or hydride requires that precautions be taken to isolate both the components and the interaction product from excessive quantities of water, oxygen, alcohol, carbon dioxide and other materials which are known to be reactive with these aluminum compounds. Small quantities of such reactive impurities are, of course, tolerable, however, it is preferred that they be essentially excluded in order to achieve maximum effectiveness of these catalyst compositions.

A more comprehensive understanding of the invention may be obtained by referring to the following illustrative examples which are not intended, however, to be unduly limitative.

EXAMPLE I

A clean dry magnetically stirred 300 milliliter autoclave is flushed with argon for five minutes and then charged with fifty milliliters of benzene, 0.25 gram (0.7 millimole) of ferric acetylacetonate, 0.3 gram (1.0 millimole) of di(2-ethylhexyl)hydrogen phosphite and 3 milliliters (4.5 millimoles) of a 20% by weight solution of triethyl aluminum in benzene. After stirring the autoclave at room temperature for five minutes, 31 grams (0.705 mole) of ethylene oxide is pressured into the autoclave and the temperature raised to 100° C. Stirring is continued at 100° C., plus or minus 5° C., for four and one-half hours. The autoclave is then vented and the catalyst deactivated by the addition of 20 milliliters of methanol. The solution is then stripped of solvent in a rotary evaporator at 100° C. under vacuum. The 17 grams of tough polymer film remaining represents a 55% conversion of ethylene oxide. Infrared analysis shows the product to be a typical polyether.

EXAMPLE II

Using the procedure of Example I, 43 grams of propylene oxide are reacted at 140° C. for two hours. The 15 gram yield of liquid poly(propyleneglycol) represents a 35% conversion of the monomer.

EXAMPLE III

The procedure of Example II is conducted at a temperature of 120° C. for a period of three hours. A 24% yield of tough polymer is recovered.

EXAMPLE IV

To a clean dry argon filled flask are added 0.25 gram of ferric acetyl acetonate, 0.5 grams of di(2-ethylhexyl) hydrogen phosphite, 3 milliliters of a 20% by weight solution of triethyl aluminum in toluene and 50 milliliters of toluene. After storing the sealed flask for 24 hours, its entire contents are introduced into a 500 milliliter magnetically stirred autoclave containing 34 grams of 1,3-butadiene and 30 grams of propylene oxide. Heating of the autoclave to 70° C. with vigorous stirring initiates a highly exothermic reaction. External heating is then withdrawn and the autoclave cooled so as to maintain the temperature of its contents below 145° C. and the pressure to less than 200 p.s.i.g. After 37 minutes, the autoclave is vented and the resulting polymer coagulated with 20 milliliters of methanol. The coagulated product is dried under vacuum to yield 34 grams of tough resilient polymer which is shown by infrared analysis to contain ether oxygen and an 8% cis, 7% trans and 85% vinyl olefin structure.

EXAMPLE V

The procedure of Example IV is repeated with 40 grams of 1,3-butadiene and 20 grams of ethylene oxide. The reaction is maintained at 70° C. for three hours to yield 32 grams of tough interpolymer having a vinyl content of 85%.

EXAMPLE VI

A clean dry magnetically stirred 300 milliliter autoclave is flushed with nitrogen and charged with 0.3 mole of 1,3-butadiene, 0.88 mole of propylene, 0.7 millimole of ferric naphthenate and 2.8 millimoles of di(2-ethylhexyl)-hydrogen phosphite. Stirring and gentle heating is then commenced and 5 milliliters of a 20% solution of triisobutyl aluminum in toluene is introduced. The reaction temperature is maintained at 100° C. for two hours, at the end of which time, the autoclave is cooled and vented and the catalyst deactivated by the addition of 25 milliliters of 50% by volume aqueous methanol. The precipitated product is dried under vacuum to yield 19 grams of a tough interpolymer polymer having a cis:trans:vinyl ratio of 13%:14%:73% and a methylene to methyl group ratio of 4:1.

EXAMPLE VII

The general procedure of Example VI is utilized to polymerize 28 grams of 1,3-butadiene with 40 grams of acrylonitrile at 120° C. After four hours at this temperature, the catalyst is deactivated as in Example VI and the entire reactor contents is then introduced into 150 milliliters of normal hexane. The precipitated material is then removed from the hexane and dried under vacuum to yield five grams of interpolymer having a cis:trans:vinyl ratio of 21%:73%:6%.

EXAMPLE VIII

The general procedure of Example VI is used to cause rapid polymerization at 30° C. to 50° C. of 36 grams of 1,3-butadiene and 12 grams of ethylene.

EXAMPLE IX

A clean dry magnetically stirred 500 milliliter autoclave is flushed with argon for five minutes and charged with 50 milliliters of benzene, 0.7 millimole of ferric chloride, 2.1 millimoles of phenyl phosphinic acid and 5 milliliters of a 20% by weight solution of triethyl aluminum in toluene. The autoclave contents are stirred at room temperature for ten minutes followed by addition of 30 grams of acrylonitrile, 58 grams of styrene and 20 grams of 1,3-butadiene. After stirring the resulting solution at 100° C. for seven hours, the autoclave is vented and 25 milliliters of methanol added. Separation and drying of the precipitate yields 32 grams of tough hard interpolymer which, upon heating at 200° C. for one hour, gives a clear very hard resin film.

EXAMPLES X THROUGH XIII

The procedure of Example IX is repeated varying the mole ratio of the monomers charged as shown below:

| Example | Mol. ratio of butadiene: acrylonitrile: styrene in charge | Mol. percent butadiene: acrylonitrile: styrene in interpolymer product | Properties interpolymer film (heated to 200° C. for 1 hr.) |
|---|---|---|---|
| X | 1:1:1 | 34:31:35 | Flexible, creases. |
| XI | 1:2:1 | 44:36:20 | Very flexible, does not crease. |
| XII | 1:1:2 | 20:24:56 | Brittle, breaks when bent. |
| XIII | 1:0.5:1 | 35:24:41 | Very flexible, does not crease. |

EXAMPLE XIV

A clean dry magnetically stirred 500 milliliter autoclave is flushed with argon for five minutes and charged with 50 milliliters of benzene, 0.25 gram of ferric acetylacetonate, 0.3 gram di(2-ethylhexyl)hydrogen phosphite and 3 milliliters of a 20% by weight solution of triethyl aluminum in toluene. The autoclave contents are stirred at room temperature for 10 minutes following which are added 32 grams of 1,3-butadiene, 19 grams of propylene and 14 grams of ethylene. After stirring the resulting solution at 100° C. for two hours, the autoclave is vented and the catalyst deactivated by the addition of 25 milliliters of 50% by volume aqueous methanol. The precipitated product is dried under vacuum to yield 15 grams of a tough hard interpolymer having a cis:trans:vinyl ratio of 24%:10%:66% respectively.

EXAMPLE XV

A clean dry magnetically stirred 500 milliliter autoclave is flushed with nitrogen for five minutes and charged with 0.7 millimole of ferric acetyl acetonate, 0.7 millimole of triphenyl phosphite, 50 milliliters of dry benzene and 5 milliliters of a 20% by weight solution of triethyl aluminum in benzene. After stirring for five minutes, 56 grams of 1,3-butadiene is introduced. The autoclave is then heated to 100° C. and held at that temperature for 1 hour, following which, unreacted gases are vented and 25 milliliters of methanol added to deactivate the catalyst. Evaporation of the solvents and liquid butadiene oligomers yields a trace of solid polymer.

EXAMPLE XVI

The process of Example XV is repeated utilizing 0.7 millimole of disphenyl hydrogen phosphite in place of triphenyl phosphite. The exothermic nature of the reaction necessitates cooling of the autoclave so as to prevent the temperature from exceeding 100° C. Twelve minutes after the initiation of the reaction, the autoclave is vented and the reaction mixture worked up as in Example XV, yielding 55 grams of solid polymer having a cis:trans: vinyl ratio of 10%:6%:84%.

EXAMPLE XVII

To a clean dry argon filled flask are added 0.2 gram of ferric acetyl acetonate, 0.5 gram of di(p-tolyl)hydrogen phosphite and 5 milliliters of a 20% by weight solution of triethyl aluminum in benzene. The sealed flask is shaken gently for ten minutes and its entire contents is then introduced into a 300 milliliter magnetically stirred autoclave containing 50 milliliters of dry benzene. Stirring is begun as 50 grams of 1,3-butadiene is introduced. The autoclave is then heated to 35° C. to 40° C., at which temperature, a vigorous exothermic reaction initiates and proceeds, in the absence of additional external heating, to a maximum of 175° C. Deactivation of the catalyst with 50 milliliters of aqueous phosphoric acid, separation of the aqueous phase and evaporation of the solvents yields 50 grams of a tough, highly cross-linked 1,2-polymer.

I claim:
1. Process for polymerizing at least one monomer selected from the group consisting of conjugated aliphatic dienes having up to 12 carbon atoms and lower 1,2-alkylene oxides comprising contacting said monomer with a catalyst consisting essentially of:
   (a) a hydrocrabon soluble iron (III) compound,
   (b) an aluminum compound selected from the group consisting of hydrocarbyl and hydride compounds of aluminum, and
   (c) a phosphorus ester having at least one phosphinic hydrogen atom.

2. The process of claim 1 wherein said aluminum compound is of the formula:

$$(R^4)_2Al-A$$

wherein $R^4$ is an alkyl radical and A is selected from the group consisting of alkyl, alkoxy and hydride radicals.

3. The process of claim 2 wherein said aluminum compound is a trialkyl aluminum.

4. The process of claim 1 wherein said phosphorus ester is of the formula:

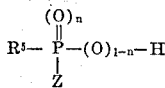

wherein Z is selected from the group consisting of H, $R^5$, and OH radicals, $R^5$ is selected from the group consisting of hydrocarbyl, substituted hydrocarbyl, hydrocarboxy and substituted hydrocarboxy radicals having 1–12 carbon atoms, and $n$ is from 0 to 1 inclusive.

5. The process of claim 4 wherein said phosphorus ester is of the formula:

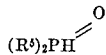

6. The process of claim 1 wherein said iron (III) compound is selected from the group consisting of ferric salts of halogen and carboxylic acids and ferric chelates.

7. The process of claim 6 wherein said iron (III) compound is ferric acetylacetonate.

8. The process of claim 1 wherein said monomer is 1,3-butadiene.

9. The process of claim 1 wherein said monomer is a lower 1,2-alkylene oxide.

10. Process for the production of an interpolymer of 1,3-butadiene with at least one lower 1,2-alkylene oxide comprising contacting an admixture of said butadiene and said alkylene oxide at a temperature of from about −30° C. to about 300° C. with a catalyst composition consisting essentially of:
   (a) an iron (III) compound selected from the group consisting of ferric salts of monocarboxylic acids and ferric chelates,
   (b) a trihydrocarbyl aluminum, and
   (c) a phosphorus ester of the formula:

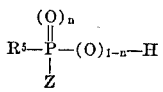

wherein Z is selected from the group consisting of H, $R^5$, and OH radicals, $R^5$ is selected from the group consisting of $C_1$–$C_{12}$ of hydrocarbyl, substituted hydrocarbyl, hydrocarboxy and substituted hydrocarboxy radicals, and $n$ is from 0 to 1 inclusive, and the molar proportions of iron, aluminum and phosphorus in said components being 1:0.1 to 1:25:25.

11. The process of claim 10 wherein said alkylene oxide is ethylene oxide.

12. The process of claim 10 wherei nsaid alkylene ovide is propylene oxide.

13. Process for the production of an interpolymer of 1,3-butadiene and at least one additional polymerizable monomer of the formula:

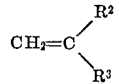

wherein $R^2$ is selected from the group consisting of hydrogen and hydrocarbyl and $R^3$ is selected from the group consisting of hydrogen, hydrocarbyl, substituted hydrocarbyl, halogen, nitrile and

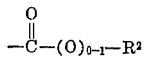

which comprises contacting an admixture of said butadiene and said additional polymerizable monomer at a temperature of from about −30° C. to about 300° C., with a hydrocarbon solution of:
   (a) an iron (III) compound selected from the group consisting of ferric salts of halogen and monocarboxylic acids and ferric chelates,
   (b) a trihydrocarbyl aluminum, and
   (c) a phosphorus ester of the formula:

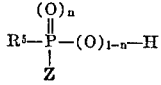

wherein Z is selected from the group consisting of H, $R^5$, and OH radicals, $R^5$ is selected from the group consisting of $C_1$–$C_{12}$ hydrocarbyl, substituted hydrocarbyl, hydrocarboxy and substituted hydrocarboxy radicals, and $n$ is from 0 to 1 inclusive, and the molar proportions of iron, aluminum and phosphorus in said components being 1:0.1:0.1 to 1:25:25.

14. The process of claim 13 wherein said additional polymerizable monomer is ethylene.

15. The process of claim 13 wherein said additional polymerizable monomer is propylene.

16. The process of claim 13 wherein said additional polymerizable monomer is acrylonitrile.

17. An elastomeric interpolymer of at least one conjugated aliphatic diene and at least one lower alkylene oxide produced by the method of claim 10.

18. An elastomeric interpolymer of 1,3-butadiene and ethylene oxide produced by the method of claim 10.

19. An elastomeric interpolymer of 1,3-butadiene and propylene oxide produced by the method of claim 10.

References Cited

UNITED STATES PATENTS

| | | | |
|---|---|---|---|
| 2,977,350 | 3/1961 | Fasce et al. | 260—94.9 |
| 3,077,467 | 2/1963 | Gurgiolo | 260—2 |
| 3,159,607 | 12/1964 | D'Alelio | 260—94.3 |
| 3,240,747 | 3/1966 | Heitmiller et al. | 260—94.9 |

WILLIAM H. SHORT, *Primary Examiner.*

T. PERTILLA, *Assistant Examiner.*

U.S. Cl. X.R.

260—94.3, 82.5, 83.5, 84.1, 85.3, 615; 252—428, 429, 430, 431, 437

UNITED STATES PATENT OFFICE
CERTIFICATE OF CORRECTION

Patent No. 3,419,505                      December 31, 1968

William E. Marsico

It is certified that error appears in the above identified patent and that said Letters Patent are hereby corrected as shown below:

Column 1, line 32, cancel "now U. S. Patent No. 3,340,489"; line 36, "art" should read -- are --. Column 4, line 26, "compositinos" should read -- compositions --; line 32, "feric" should read -- ferric --. Column 9, line 23, "disphenyl" should read -- diphenyl --. Column 10, line 44, "wherei nsaid alkylene ovide" should read -- wherein said alkylene oxide --.

Signed and sealed this 9th day of December 1969.

(SEAL)
Attest:

Edward M. Fletcher, Jr.                WILLIAM E. SCHUYLER, JR.
Attesting Officer                         Commissioner of Patents